July 27, 1965
A. C. ROBERT ETAL
3,197,772
METHOD AND DEVICE FOR DETECTING MOVING
OBJECTS BY RADIO MEANS
Filed March 1, 1962
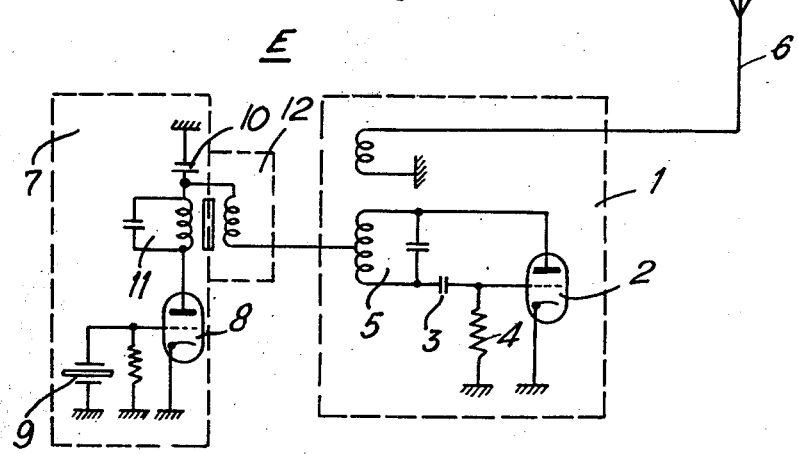
Fig. 1
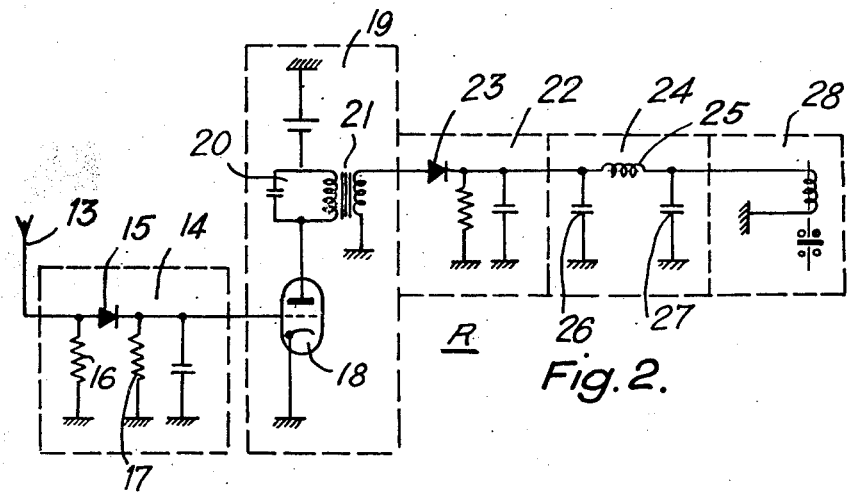
Fig. 2.
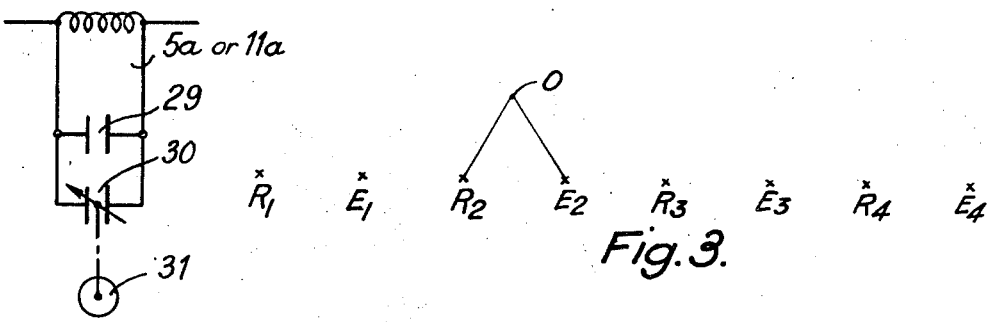
Fig. 4.
Fig. 3.

United States Patent Office 3,197,772
Patented July 27, 1965

3,197,772
METHOD AND DEVICE FOR DETECTING MOVING OBJECTS BY RADIO MEANS
André Charles Robert, Eaubonne, and Louis Marie Alphonse Guy Paul d'Izarny-Gargas, Paris, France, assignors to Sud-Aviation Société Nationale de Constructions Aéronautiques, Paris, France
Filed Mar. 1, 1962, Ser. No. 176,569
Claims priority, application France, Mar. 3, 1961, 854,444, Patent 1,290,334
8 Claims. (Cl. 343—7.7)

This invention relates to an equipment designed to detect nearby moving objects, and which, when used in numbers, is capable of constituting an electromagnetic barrier for use in detecting moving objects on land, at sea or in the air.

As is well known, when a radio receiver receives both the waves transmitted by a radio transmitter and the waves reflected by a moving obstacle, the said reflected waves being affected by the Doppler-Fizeau effect resulting from the beat between these two waves, the receiver will cause the Doppler-Fizeau signal to appear. Such a general arrangement, however, will lend itself to a multiplication of the transmitters and receivers only if one of the following two dispositions is adopted:

(a) The transmitters, as a whole, are synchronized in phase;

(b) The frequencies of the various transmitters are very different from one another and therefore distributed over an extended frequency range.

For indeed, a given receiver will receive all of the signals transmitted by the various transmitters, and these signals will interfere with one another and may cause fictitious Doppler signals to appear in the receiver. Both the solutions envisaged above are difficult to put into effect. The former is extremely costly, while the latter creates a degree of congestion in the ether which is incompatible with normal radio traffic.

With a view to avoiding the aforementioned drawbacks while at the same time enabling multiplicities of transmitter and receiver systems to be used at operating frequencies that are distributed in non-congestive fashion in the ether, this invention has for its object a method of detecting moving objects, wherein, at each of several transmission/reception stations that are contiguous or not, a non-stabilized carrier wave of very high frequency is emitted which is amplitude-modulated by an intermediate-frequency sub-carrier, whereby on reception the various sub-carriers appear modulated in amplitude at low frequencies due to the Doppler effects between the whole of the waves emitted and the whole of the echo waves reflected by the moving object, then, after detection of these beats, the resulting signals are filtered in order to leave only those Doppler components which result from the interference of each wave emitted with its own echo wave, reflected off the moving object, the carrier and/or sub-carrier frequencies having different values which are very close to one another from one station to the next. The frequency of any one station preferably differs by less than one thousandth of that of the adjoining stations.

In this manner, elimination is ensured of any fictitious Doppler signals resulting either from jamming or from interference between the wave emitted by one station and the waves reflected by the moving object but emanating from a different station. In addition, since the carrier and sub-carrier frequencies are distributed over a narrow frequency range, congestion of the ether remains small.

It is a further object of the invention to provide a device for detecting moving objects, or an electromagnetic barrier, enabling the method hereinbefore specified to be carried into practice, which device comprises a multiplicity of transmitting/receiving stations, each of which is provided with a transmitter consisting of a VHF self-oscillator which is coupled to an antenna and the signals from which are amplitude-modulated by a sub-carrier furnished by an auxiliary IF oscillator, and a receiver consisting of a wide-band detector which furnishes the various sub-carriers amplitude-modulated by the Doppler frequencies resulting from the beats between all the waves emitted and all the echo waves reflected off the moving object, and a medium-band amplifier, which is tuned to the sub-carrier frequency and which receives its signals from said first detector, supplying a second detector furnishing the voltages resulting from detection of the whole of the Doppler signals to a very-low-pass-band filter embodying a time-constant which furnishes only the Doppler beat signals between the various waves emitted and their respective echo waves off the moving object and which transmits them to a warning device, the transmitters having carrier and/or sub-carrier frequencies that are different from one another and chosen from a small number of neighboring frequencies. The carrier furnished by each VHF self-oscillator is preferably non-stabilized.

This invention additionally relates to industrial applications of the detection method and device hereinbefore specified, particularly in regard to the detection of nearby moving obstacles on land, at sea and in the air.

The description which follows with reference to the accompanying drawings, filed by way of example and not of limitation, will give a clear understanding of how the invention may be carried into practice and will reveal other features thereof.

In the drawings:

FIG. 1 is the wiring diagram of one of the transmitter stations of the moving object detection device according to the invention;

FIG. 2 is the wiring diagram of a receiver station corresponding to the transmitter station of FIG. 1;

FIG. 3 is a diagrammatic illustration of the lay-out for a plurality of transmitting receiving stations forming an electromagnetic barrier; and FIG. 4 schematically illustrates the wiring diagram of a means usable in the transmitter of FIG. 1 for providing a voluntary variation of the carrier and/or sub-carrier frequencies.

Referring now to FIG. 1, the transmitter station E illustrated therein comprises a VHF self-oscillator 1 which transmits a non-stabilized carrier wave. This self-oscillator comprises a triode 2, a bias capacitor 3, a bleeder resistor 4 and an oscillating circuit 5. It is coupled to an antenna 6. The said transmitter station further comprises an auxiliary IF oscillator 7 having a triode 8 which is controlled by a quartz 9 and the anode voltage of which is supplied by a current source 10. The oscillating circuit 11 of this auxiliary oscillator is coupled to the oscillating circuit 5 of self-oscillator 1 through a transformer 12, so that the carrier wave emitted by self-oscillator 1 is amplitude-modulated by the IF sub-carrier emitted by auxiliary oscillator 7.

The receiver R illustrated in FIG. 2 comprises an antenna 13 linked to a wide-band detector 14 comprising a crystal detector 15, a coupling resistor 16 and an impedance matching resistor 17. As the result of the beat set up between the signals received directly from the transmitter E and the echo signals reflected by a moving object, this detector 14 provides the sub-carrier which is amplitude-modulated by the resulting Doppler effect. The thus detected signals are amplified by the triode 18 of a medium-band amplifier 19 which is tuned to the sub-carrier frequency by its resonant circuit 20. This signal is transmitted by a transformer 21 to a detector 22 provided with a crystal detector 23, which furnishes the Doppler signals carried by the sub-carrier frequency to a very-low-pass-band filter 24 consisting of a π circuit comprising a choke coil 25 and two capacitors 26 and 27. The constants of this filter are determined, on the one hand, so that it possesses a time constant and, on the other hand, so that it passes only those signals the frequencies of which are less than a few periods, in order to eliminate all Doppler beat signals between the wave transmitted by the transmitter E and such echo waves off the moving object as emanate from a different transmitter. Thus, only the Doppler signals that are set up between the various waves transmitted by the transmitters E and their respective echo waves reflected off the moving object pass through this filter and are transmitted to a warning indicator 28.

If, for example, the carrier frequency is 200 mc./s. and that of the sub-carrier 500 kc./s., the amplifier 9 will pass only an 8 kc./s. band on either side of 500 kc./s., while the very-low-pass-band filter 24 will pass only signals of frequency less than 20 c.p.s.

With a view to ensuring detection of moving objects over a very large area, as shown in FIG. 3, recourse is had to an in-line electromagnetic barrier comprising transmitters $E_1$, $E_2$, $E_3$, $E_4$ and receivers $R_1$, $R_2$, $R_3$, $R_4$. In order to be able to asses the barrier effect obtained in this way, with reference to a moving obstacle O travelling in front of the barrier, it will be assumed, by way of indication, that the various frequencies have been chosen as follows:

The carrier emitted by $E_1$ has a frequency of 199,900 kc./s. with a sub-carrier of 500 kc./s., the carrier emitted by $E_2$ a frequency of 200 mc./s. with a sub-carrier at 500 kc./s., the carrier emitted by $E_3$ a frequency of 200 mc./s. with a sub-carrier at 500.5 kc./s. and the carrier emitted by $E_4$ a frequency of 200,100 kc./s. with a sub-carrier at 500.5 kc./s.

It is assumed that the near-by moving object is a man walking in front of the barrier. The receiver $R_2$ receives the signal emitted by the transmitter $E_2$, and its echo off the object O is affected by the Doppler effect. Since the beat frequency is, as is well known, equal to about $2V_R/\lambda$, where $V_R$ is the radial velocity of the moving object with reference to the receiver $R_2$ and $\lambda$ the wavelength, the said beat frequency will in this specific case be less than 20 c.p.s. As a result, the receiver $R_2$ will give the alarm signal when such propagation takes place, since the frequency of the Doppler effect is below the band-pass threshold of its very-low-pass-band filter. Similarly the signal emitted by the transmitter $E_1$ and its echo reflected off the object O further produce, in the receiver $R_2$, a beat which passes through the IF and then into the very-low-pass-band filter of receiver $R_2$ and operates the warning system. This likewise applies to the signals emitted by the transmitters $E_3$ and $E_4$ and their respective echoes off the moving obstacle O. As a result, all the signals emitted by the barrier transmitters $E_1$, $E_3$, $E_4$ and their respective echo waves enable the alarm device of the receiver $R_2$ to be operated, and this also applies to receivers $R_1$, $R_3$ and $R_4$.

Manifestly, if the power of the transmitters E and the sensitivity of the receivers R be reduced for reasons of economy, only that wave which is emitted by $E_2$ and received by $R_2$ will ensure the security of the barrier, the remaining waves not affecting $R_2$ but in no way disturbing the system as a whole.

Consideration will now be given to the beats occurring in the receiver $R_2$, between the waves emanating directly from a transmitter and the waves reflected by the obstacle O but originating from another transmitter. Let D be the Doppler shift affecting the wave emitted by $E_1$ and reflected by O. In view of the frequencies precedingly assigned to $E_1$ and $E_2$, the receiver $R_2$ will receive the beat set up between the 199,900 kc./s.+D wave reflected by O when receiving the wave emitted by $E_1$ and the 200 mc./s. wave emitted by $E_2$, both these waves being modulated at 500 kc./s. The beat between them will produce signals which are modulated by the Doppler effect but which are outside the frequency of the very-low-pass-band filter of $R_2$, as a result of which they will be stopped by the said filter. In the case of the beat taking place between the wave emitted by $E_2$ and the wave reflected by O when receiving the wave emitted by $E_3$, this results in a beat providing a sub-carrier at 500 kc./s., modulated at 500 c.p.s.+D. This sub-carrier will pass through the amplifier tuned to the sub-carrier frequency and will produce a signal at 500 c.p.s.+D which will be stopped by the very-low-pass-band filter of $R_2$.

Thus, by using a very small transmission band over the ether, it is possible, by operating either on the carrier frequency, or on the sub-carrier frequency, or on both simultaneously, to constitute a network in which only valid signals are able to pass through the very-low-pass-band filter of each receiving station.

Another feature of this invention is that the transmitter furnishing the carrier need not be stabilized. Indeed two non-stabilized transmitters such as $E_1$ and $E_2$ may, through a fortuitous shift, attain coincidence or near-coincidence. Such an occurrence, were it to be persistent, would result in the production of a signal having the same characteristics as a fictitious Doppler signal. In other words, such an occurrence would be liable to operate the alarm despite the fact that there would be no moving object in front of the barrier. In order to overcome this drawback, use is made both of the fact that the probability that the two carriers would approach to within less than 20 c.p.s. is very small, and of the fact that even should such an approach arise it would be of very short duration only. Since the very-low-pass-band filter embodies a time-constant, any fortuitous coincidence will disappear before the warning device operates.

The time-constant of the very-low-pass-band filter is normally dependent upon the constants of its components, i.e., the choke coil and the capacitors. Should the need arise, the filtering cells may be multiplied, or extra capacitive elements added, as well known, to lengthen the said time-constant such as the capacitor of detector 22.

The last property of the system is utilized in order to prevent jamming by a distant but powerful station. To this end, the transmitters furnish non-stabilized carriers and sub-carriers, the frequency shifts being due either to a natural variation in the transmission circuit constants or to a voluntary variation produced by any convenient electronic or electro-mechanical means.

The frequency variation may be obtained, as well known in the art, by modifying either the two constants, inductance and capacity, of the transmitter oscillating circuits, or by means of a pure electronic process, such as by the use of a reactance-valve stage. Alternatively, the frequency variation may be conventionally obtained by electro-mechanical means, by varying the mechanical dimensions of the component elements of the transmitters, through the use, say, of an adjustable capacitor operated by an electric motor or a choke oil flattened to a greater or lesser extent in response to a vibrator, or by any other convenient and conventional means. For instance, as illustrated in FIG. 4 and as well known in the art, either or both of the oscillating circuits 5a, 11a of the emitter may comprise a fixed capacitor 29 and an adjustable capacitor 30 operated by an electric motor 31, so that the operator acting on said motor may voluntarily vary the carrier and/or sub-carrier frequencies.

While there has been shown and described, the presently preferred embodiment of the detecting device of this invention, it will be well understood by those skilled in the art that various changes and modifications may be made in this embodiment within the scope of the invention as set forth in the appended claims:

What we claim is:

1. A device for detecting nearby moving objects comprising, in combination, a multiplicity of transmission stations, each one of which comprises a transmitter comprising a VHF self-oscillator generating a carrier-wave of very high frequency, an emitting antenna coupled to said transmitter, an auxiliary IF oscillator generating an intermediate-frequency wave, and means for amplitude-modulating said carrier-wave by said intermediate frequency wave which constitutes a sub-carrier wave; and a multiplicity of reception stations, each one of which comprises a receiving antenna, a receiver coupled to said receiving antenna and comprising a first wide-band detector which furnishes the various sub-carriers emitted by all said transmission stations which are amplitude-modulated by the Doppler effects resulting from the beats between the whole of the waves emitted by all said transmission stations and the whole of the waves reflected from a moving object to be detected, a medium-band amplifier which is tuned to the band of the frequencies of all the emitted sub-carriers and which receives its signals from said wide-band detector, a second detector supplied by said amplifier and furnishing all the Doppler signals due to the beats of all the carrier waves emitted with all the echo waves, a very-low-pass-band filter having a time-constant, receiving the Doppler signals of said second detector and furnishing only the Doppler beat signals between all the carrier wave emitted and their own echo waves from the moving object, and a warning device supplied from said filter, the frequencies of at least one of the two groups formed by the carrier waves and the sub-carrier waves emitted by the transmitters being different from one transmitter to another and chosen from a small number of neighbouring frequencies.

2. A detection device according to claim 1, wherein the frequency of at least one of the carrier wave and of the sub-carrier wave emitted by each emitter differs by less than one thousandth of that of the corresponding wave of the adjoining transmitters.

3. A detection device according to claim 1, wherein the VHF oscillator and the auxiliary IF oscillator respectively have oscillating circuits, and wherein the means for amplitude modulating the carrier wave by said intermediate frequency wave comprises a transformer interconnecting said oscillating circuits.

4. A detection device according to claim 1, wherein the carrier wave furnished by each VHF self-oscillator is non-stabilized.

5. A detection device according to claim 1, wherein the upper band-pass threshold of the very-low-pass-band filters is approximately 20 c.p.s.

6. A detection device according to claim 1, wherein each very-low-pass-band filter comprising at least one $\pi$ circuit.

7. A detection device according to claim 6, wherein each $\pi$ circuit includes at least one supplementary capacitive element.

8. A detection device according to claim 1, wherein the transmitters comprise means for providing a voluntary variation of the carrier and sub-carrier frequencies.

References Cited by the Examiner

UNITED STATES PATENTS 2,491,542  12/49  Woodyard _____ 343—8

CHESTER L. JUSTUS, *Primary Examiner*.